United States Patent [19]
Kessler et al.

[11] 3,784,235
[45] Jan. 8, 1974

[54] TUBULAR ADHESIVE JOINT WITH SNAP LOCK

[75] Inventors: Hyman Kessler, Silver Spring; Harvey L. Peritt, Beltsville, both of Md.

[73] Assignee: The United States of America as represented by the Secretary of the Navy, Washington, D.C.

[22] Filed: Oct. 8, 1971

[21] Appl. No.: 187,673

[52] U.S. Cl....... 285/21, 285/DIG. 16, 285/DIG. 22
[51] Int. Cl. .......................... F16l 13/10, F16l 47/02
[58] Field of Search................... 285/305, 319, 322, 285/374, DIG. 16, DIG. 22, 94, 284, 369, 21

[56] References Cited
UNITED STATES PATENTS

| | | | |
|---|---|---|---|
| 3,666,297 | 5/1972 | Marks...................... | 285/DIG. 16 X |
| 2,525,799 | 10/1950 | Hecker.......................... | 285/374 X |
| 3,645,547 | 2/1972 | Glover..................... | 285/DIG. 22 X |
| 2,366,067 | 12/1944 | Smith...................... | 285/DIG. 22 X |
| 2,329,490 | 9/1943 | Smith............................. | 285/374 X |
| 2,366,814 | 1/1945 | Smith............................. | 285/369 X |
| 2,998,269 | 8/1961 | Houghton....................... | 285/374 X |

FOREIGN PATENTS OR APPLICATIONS
1,223,276  2/1971  Great Britain............... 285/DIG. 22

*Primary Examiner*—Jacob Shapiro
*Assistant Examiner*—David H. Corbin
*Attorney*—R. S. Sciascia, J. A. Cooke and M. G. Raskin

[57] ABSTRACT

A pipe coupling including male and female attachment members connected to a pair of tubular sections which are to be coupled. The female attachment member includes a circumferential groove formed interiorly therein while the male attachment member includes a reduced diameter portion whose outer diameter is smaller than the inner diameter of the female attachment member and which has an outwardly extending lip formed at the edge thereof which will interfere with the female attachment member on assembly. Adhesive is deposited on the outer surface of the reduced diameter portion and on the inner surface of the female member and upon assembly, the male member is inserted into the female member until the lip snaps into the groove whereupon both a mechanical and adhesive connection is attained.

7 Claims, 4 Drawing Figures

INVENTORS
HYMAN KESSLER
HARVEY L. PERITT
BY

AGENT

ATTORNEY

TUBULAR ADHESIVE JOINT WITH SNAP LOCK

BACKGROUND OF THE INVENTION

This invention relates generally to a pipe coupling, and more particularly to a pipe coupling utilizing both an adhesive type and mechanical joint connection.

In the past, mechanical pipe connections have been employed in joining pairs of tubular sections. Problems arose, however, when the tubular sections were formed of non-yielding or brittle materials. In such cases when the sections were provided with holes or notches necessary to complete these mechanical connections, the stress concentrations created in the vicinity of such hole or notch could not be reduced by local yielding in a brittle material as they could be in a ductile material. Therefore, it was not uncommon for a joint connecting two tubular sections formed of brittle material to mechanically fail due to stress concentrations localized in the vicinity of geometrical discontinuities necessitated by the mechanical fastening means.

Adhesive type fastening means have been used to connect pairs of tubular sections together. One of the most simple adhesive joints for connection of tubular sections is the so-called telescoping overlap joint wherein the end portion of one tubular section is reduced in diameter in order to snugly fit within the end portion of the other tubular section. The outer surface of the reduced diameter tubular portion was coated with an adhesive intended to secure the sections together after the reduced section was inserted within the other section. A major disadvantage of this joint appeared, however, when, upon assembly, the adhesive was "wiped-out" of the joint area i.e., the inner surface of the outer tubular section would push the adhesive out of position. In order to alleviate the problem of adhesive wipe-out, two other adhesive joints were developed. The first, commonly known as a scarf joint, comprised male and female tubular sections including end portions having conforming tapered surfaces. The male end portion is formed with an inwardly extending tapered configuration the outermost extremity thereof, i.e., the location at which the end portion merged with the normal tubular section, having a vertical surface formed thereon. The joint is designed so that when the edge of the female end portion abuts the vertical surface described hereinabove a gap is maintained between the conforming tapered surfaces thereby providing a space in which the adhesive may remain without being wiped-out and also provided for a uniform adhesive thickness. However, the scarf joint created problems in that very close control was necessary when machining the end portions of the respective tubular sections and any small misalignment of the tubes on assembly would result in large variations in the thickness of the adhesive joint. Since the strength of an adhesive joint is optimized when the adhesive thickness is in the range of 0.003 to 0.008 inches, uniform adhesive thickness is critical and variations prove quite undesirable. Further, any movement of the tubular sections after assembly and prior to the adhesive curing was likely to produce void areas in the adhesive. These voids are susceptible to fluid penetration at high pressures, thereby reducing the strength of the joint connection. The second type of adhesive joint developed to obviate the problem of adhesive wipe-out was a variation of the telescoping joint described hereinabove wherein a circumferentially extending clearance channel was machined on the outer surface of the reduced diameter end portion and a pair of small holes formed in the outer section wall adapted to overlie the channel upon assembly. The adhesive would be pumped into one hole and fill the channel adhering to the opposed surfaces of the respective tubular sections until it began to extrude from the other hole. The major disadvantage of this type of joint was that the space provided by the channel for the adhesive was difficult to completely fill since injection of adhesive would be a blind operation and void areas could be left without the operator's knowledge. Again, any void areas would make the joint susceptible to failure. Further, the small filling hole acted as a potential failure site due to stress concentrations in the vicinity of the hole. Another disadvantage common to the prior art adhesive joint connection is that since a positive pressure was absent between the mutually opposed surfaces, paste or liquid adhesives had to be used, the thickness of which could not be accurately controlled. "Film" adhesives were much more desirable.

SUMMARY OF THE INVENTION

Accordingly, one object of this invention is to provide a new and improved joint connection for tubular sections.

Another object of the invention is the provision of a new and improved adhesive joint connection for tubular sections.

Still another object of the present invention is to provide a new and improved adhesive joint connection which is amenable to the use of film adhesives.

A further object of the instant invention is to provide a new and improved adhesive joint connection in which there is no adhesive wipe-out.

A still further object of this invention is the provision of a new and improved adhesive joint connection in which voids will not be present in the adhesive subsequent to the curing thereof.

Another still further object of the instant invention is the provision of new and improved adhesive joint apparatus in which the precise machining and positioning an assembly necessitated by the prior art device is not necessary.

Still another further object of the instant invention is to provide a new and improved adhesive joint connection for tubular sections which may incorporate, additionally, mechanical fluid seals.

Briefly, in accordance with one embodiment of this invention, these and other objects are attained by providing the end portions of a pair of tubular sections to be connected with male and female attachment members, respectively. The female attachment member includes a tubular member having a circumferential groove interiorly formed a predetermined distance from the edge thereof. The male member includes a reduced diameter portion whose outer diameter is slightly smaller than the inner diameter of the female attachment member. An outwardly extending lip is formed at the edge of the male attachment member. Prior to attachment, adhesive is deposited on the outer surface of the reduced diameter portion of the male member and the inner surface of the female member in front of the groove whereupon the male member is inserted within the female member. The extended lip cuases an interference fit during assembly and prevents the inner surface of the female member from wiping out the adhesive material while the lip pushes the adhesive on the female member into the groove. Upon reaching the annular groove, the lip expands thereinto thus positioning the male and female attachment members and allowing the adhesive to come into mutual contact with the surfaces of each. An O-ring may be provided to facilitate the fluid seal.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
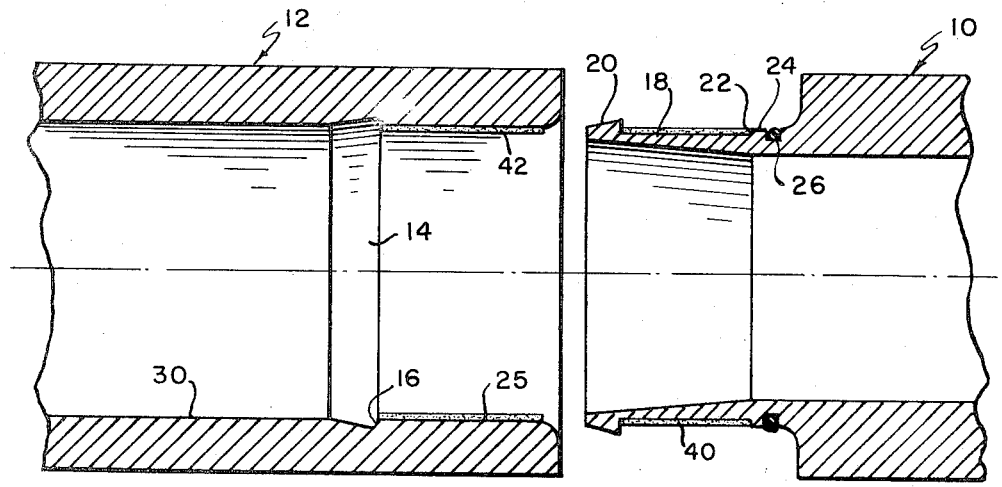
FIG. 1 is a side view in section of the attachment members comprising one embodiment of this invention.

Referring now to the drawings wherein like reference characters designate corresponding parts throughout the several views, and more particularly to FIG. 1 thereof, the invention is shown as comprising male and female attachment members 10 and 12, respectively, which may be connected by conventional means to a pair of tubular sections (not shown) which are to be fluidly connected to each other or may be integral with the tubular sections. The female attachment member 12 may be formed of a reinforced plastic material and generally will have a circular cross section conforming to the tubular section, although other configurations may be utilized within the scope of the present invention. The female attachment member 12 has a circumferential groove 14 formed interiorly therein a predetermined distance from the edge thereof. The groove 14 is of increasing depth in the direction of the edge surface of the female attachment member terminating in a substantially vertical surface 16.

The male attachment member 10 may be formed of a metallic material and includes a reduced diameter end portion 18 having an outwardly extending lip 20 formed at the end thereof. The lip 20 conforms to the tapered shape of groove 14 in the female attachment member and is formed with an outer diameter sufficiently large to cause an interference fit with the inner surface of female attachment member 12. The reduced diameter end portion 18 of the male attachment member 10 has an outer diameter which is slightly smaller than the inner diameter of female attachment member 12. The reduced diameter portion 18 terminates at a shoulder 22 which defines the beginning of a second reduced diameter portion 24 of a length substantially shorter than the length of reduced diameter portion 18. The outer diameter of second reduced diameter portion 24 is substantially equal to the inner diameter of female attachment member 12 and upon insertion therewithin snugly cooperates therewith as will be described in the discussion of the assembly of the device.

An O-ring 26 may be provided within a groove formed in the second reduced diameter portion 24.

In assembly, a film adhesive 40 such, for example, as Adhesive FM123, manufactured by American Cyanamid, Bloomingdale Division, is applied to the outer surface of reduced diameter end portion 18 and a conventional liquid adhesive 42 is applied to the inner surface 25 of female attachment member 12 between annular groove 14 and the edge thereof. Male attachment member 10 is then forced into female attachment member 12. Since lip 20 causes an interference fit condition with the inner surface 25 of female attachment member 12, a press fitting operation is required. The end portion of male attachment member 10 is forced to flex inwardly while surface 25 comprising the portion of female attachment member 12 in front of groove 14 is forced to flex outwardly. The adhesive on the inner surface 25 of female attachment 12 acts as a lubricant as it is wiped into the groove 14. During assembly, however, the lip 20 prevents the inner surface 25 of female member 12 from contacting the film adhesive deposited on the surface of reduced diameter portion 18 thereby preventing wipe-out from occurring with respect thereto. When the male attachment member is pushed sufficiently far into the female attachment member, the lip 20 snaps into groove 14 and the surfaces of the respective members which had been forced away from each other are now permitted to attain their original configuration. A positive pressure is thereupon exerted on both the adhesive and O-ring 26.

Thus, it is seen that the two attachment members are fixably positioned to each other in a manner whereby the adhesive contained in a uniformly fixed space and in a manner wherein relative movement will not occur.

Figure 2:
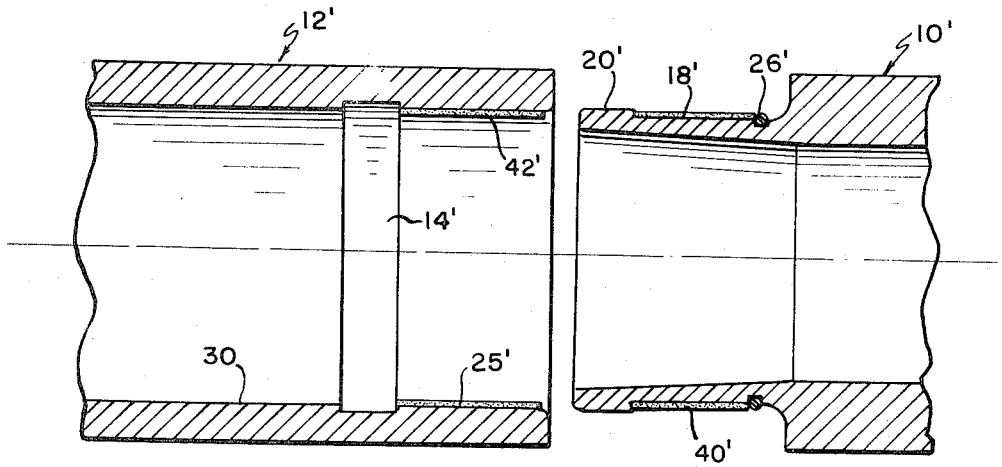
FIG. 2 is a side view in section of the attachment members comprising a second embodiment of this invention.

Referring now to FIG. 2, another embodiment of the invention is illustrated substantially identical to the embodiment shown in FIG. 1 except that the outer diameter of the reduced diameter end portion, denoted as 18', is designed to be slightly larger than the inner diameter of the female attachment member 12'. In this case, when lip 20' is received in groove 14', an interference fit is achieved between reduced diameter end portion 18 and the inner surface 25' of female member 12'. The interference fit results in a much larger pressure on both the adhesive 40 and O-ring thereby providing a better connection due, among other reasons, to a friction fit created between the attachment members.

Figure 3:
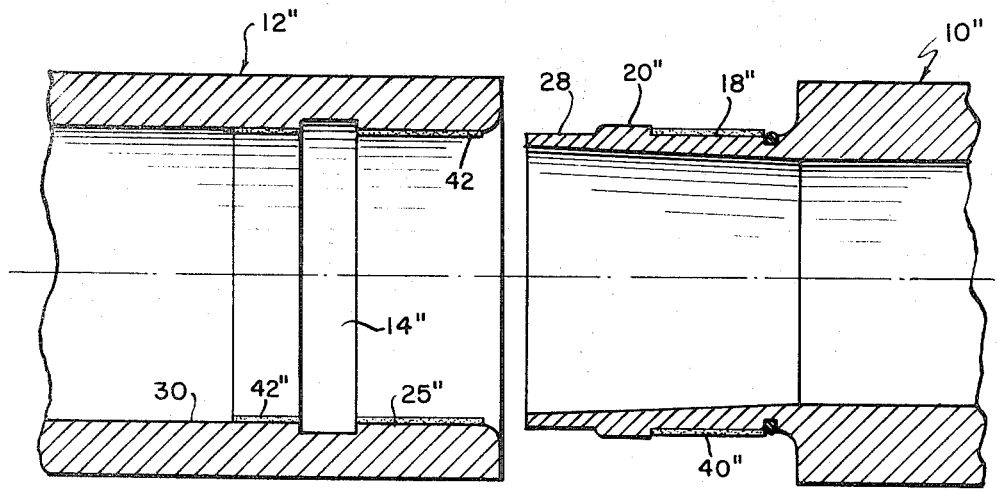
FIG. 3 is a side view in section of still another embodiment of this invention.

Referring to FIG. 3, the reduced diameter portion 18'' of male attachment 10'' has been extended as at 28 beyond groove 14''. This extension of the reduced diameter portion effectively increases the adhesive 42 bonding area. Adhesive may be applied to the inner surface of female attachment member 12'' on the other side of groove 14'', i.e., at surface 30. Adhesive 42 applied to surface 30 will not be wiped away due to the action of lip 20'' forcing the respective surfaces of the male and female attachment members away from each other as described hereinabove.

Figure 4:
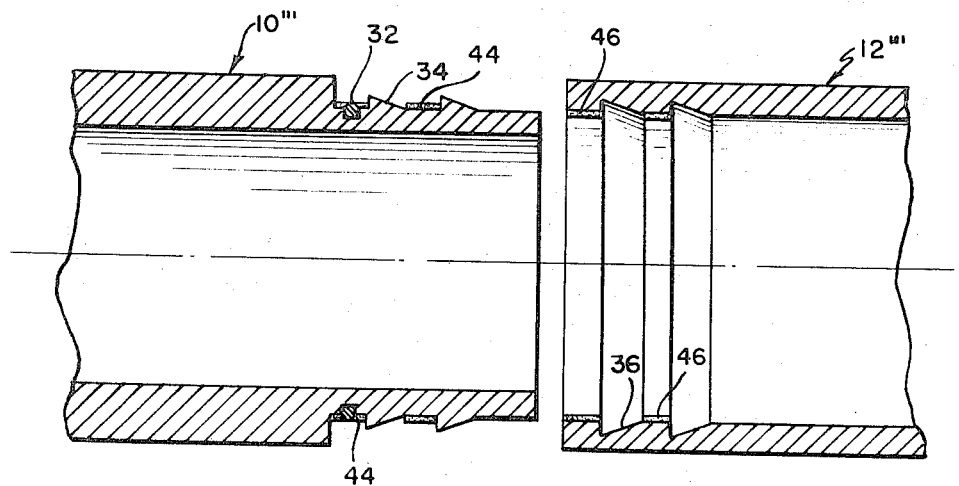
FIG. 4 is a side view in section of yet another embodiment of this invention.

During assembly, the clearance obtained at the lip is equal to the height of the lip and this height is limited by the structural strength of the attachment members. The clearance decreases as the distance from the lip increases and the rate of decrease depends only on the radii of the attachment members and their thicknesses. The greater the radius and thickness, the smaller is the rate of the decrease of the clearance. If the clearance is so large that an O-ring or adhesive could not be incorporated at the outer edge of the joint then a embodiment as shown in FIG. 4 might be employed. In the embodiment shown in FIG. 4 an O-ring 32 is located adjacent to a second lip 34 and upon assembly the required clearance is obtained by the interference of the second lip 34 with the inner surface of female attachment member 12'. The female attachment member is provided with a second groove 36 to accomodate second lip 34. Adhesive film 44 is applied to the male attachment number 10''' aft of the first and second lips 34. On the female attachment member, an adhesive film 46 is applied on the inner surface thereof forward of first and second grooves 36.

It is to be noted that a film adhesive may be used in the invention as disclosed and will give inherently better results than a paste or liquid adhesive since the glue line thickness is accurately controlled. The positive pressure required to cure a film adhesive will be present in all the embodiments illustrated.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. Apparatus for coupling a first tubular section to a second tubular section comprising:
    a female tubular attachment member having one end connectable to said first tubular section and at least two circumferential grooves formed interiorly therein inwardly of the other end;
    a male tubular attachment member, receivable within said female attachment member, having one end connectable to said secone tubular section and a reduced diameter end portion having at least two radially outwardly-extending, circumferential lips receivable within said grooves, said lips of outer diameter larger than the inner diameter of said female attachment member;
    an O-ring positioned adjacent to one of said lips;
    a first coating of adhesive on the interior surface of said female attachment member outward of said grooves; and
    a second coating of adhesive on the exterior surface of said reduced diameter end portion, said second coating extending inwardly of said lips
    whereby upon coupling insertion of said male attachment member into said female attachment member said circumferential lips distend said female member and force said first adhesive coating into said grooves, said second adhesive coating remaining undisturbed until contact with the inner surface of said female member with coupling engagement of said lips and said grooves.

2. Apparatus for coupling a first tubular section to a second tubular section comprising:
    A female tubular attachment member having one end connectable to said first tubular section and a circumferential groove formed interiorly therein inwardly of the other end;
    a male tubular attachment member, receivable within said female attachment member, having one end connectable to said second tubular section and a reduced diameter portion integrally formed at the other end;
    a radially outwardly-extending, circumferential lip formed on said reduced diameter portion having a shape substantially conforming to said groove, the outer diameter of said lip being larger than the inner diameter of said female attachment member;
    a first coating of adhesive on the interior surface of said female attachment member outward of said groove;
    a second coating of adhesive on the exterior surface of said reduced diameter portion, said second coating extending inwardly of said lip,
    whereby upon coupling insertion of said male attachment member into said female attachment member said circumferential lip distends said female member and forces said first adhesive coating into said groove, said second adhesive coating remaining undisturbed until contact with the inner surface of said female member with coupling engagement of said lip and said groove.

3. Coupling apparatus as defined in claim 2 wherein said reduced diameter portion extends beyond said lip.

4. Coupling apparatus as defined in claim 3 further including an O-ring positioned within a groove formed in said reduced diameter end portion.

5. Coupling apparatus as defined in claim 1 further including an O-ring positioned in a groove formed in said reduced diameter end portion.

6. Coupling apparatus as defined in claim 5 wherein:
    said reduced diameter end portion has an outer diameter smaller than the inner diameter of the female attachment member.

7. Coupling apparatus as defined in claim 5 wherein:
    said reduced diameter end portion has an outer diameter larger than the inner diameter of the female attachment member.

* * * * *